(12) United States Patent
Wimmer

(10) Patent No.: US 7,204,379 B2
(45) Date of Patent: Apr. 17, 2007

(54) CRANE

(75) Inventor: Eckhard Wimmer, Hallein (AT)

(73) Assignee: Palfinger, AG, Bergheim (AT)

( * ) Notice: Subject to any disclaimer, the term of this patent is extended or adjusted under 35 U.S.C. 154(b) by 83 days.

(21) Appl. No.: 10/929,540

(22) Filed: Aug. 31, 2004

(65) Prior Publication Data

US 2005/0045575 A1 Mar. 3, 2005

(30) Foreign Application Priority Data

Sep. 1, 2003 (EP) .................. 03450193

(51) Int. Cl.
*B66B 23/04* (2006.01)

(52) U.S. Cl. .................. 212/350; 384/10

(58) Field of Classification Search .......... 212/350; 384/10, 37

See application file for complete search history.

(56) References Cited

U.S. PATENT DOCUMENTS

| 1,952,379 | A | * | 3/1934 | Lee ............... 384/10 |
| 3,719,403 | A | | 3/1973 | Sung |
| 4,168,008 | A | * | 9/1979 | Granryd .......... 212/350 |
| 4,304,449 | A | * | 12/1981 | Litchfield et al. ...... 312/334.18 |
| 4,385,704 | A | * | 5/1983 | Spain et al. .......... 212/350 |
| 4,423,914 | A | * | 1/1984 | Vander Ley .......... 312/333 |
| 4,555,148 | A | * | 11/1985 | de Willigen et al. ...... 384/43 |
| 4,652,146 | A | * | 3/1987 | Ellermann et al. ...... 187/409 |
| 4,793,765 | A | * | 12/1988 | Paul et al. .......... 414/718 |
| 4,986,674 | A | * | 1/1991 | Decker et al. .......... 384/10 |
| 5,143,454 | A | * | 9/1992 | Morita .............. 384/37 |
| 5,624,047 | A | * | 4/1997 | Challberg et al. ...... 212/350 |
| 5,639,177 | A | | 6/1997 | Thomas |
| 6,499,612 | B1 | * | 12/2002 | Harrgington et al. ...... 212/350 |

FOREIGN PATENT DOCUMENTS

| DE | 2442285 | 3/1976 |
| JP | 2002-8328 | 1/2002 |
| WO | 95/16145 | 6/1995 |

\* cited by examiner

*Primary Examiner*—Thomas J. Brahan
(74) *Attorney, Agent, or Firm*—Wenderoth, Lind & Ponack, L.L.P.

(57) ABSTRACT

A crane has at least one telescopic crane arm with at least two sliding arms that are moveable against each other. At least one gliding element, which is housed in a frame in a detached and unfastened manner, is arranged between the sliding arms. The gliding element has a separate spring element projecting from the gliding surface of the gliding element.

12 Claims, 3 Drawing Sheets

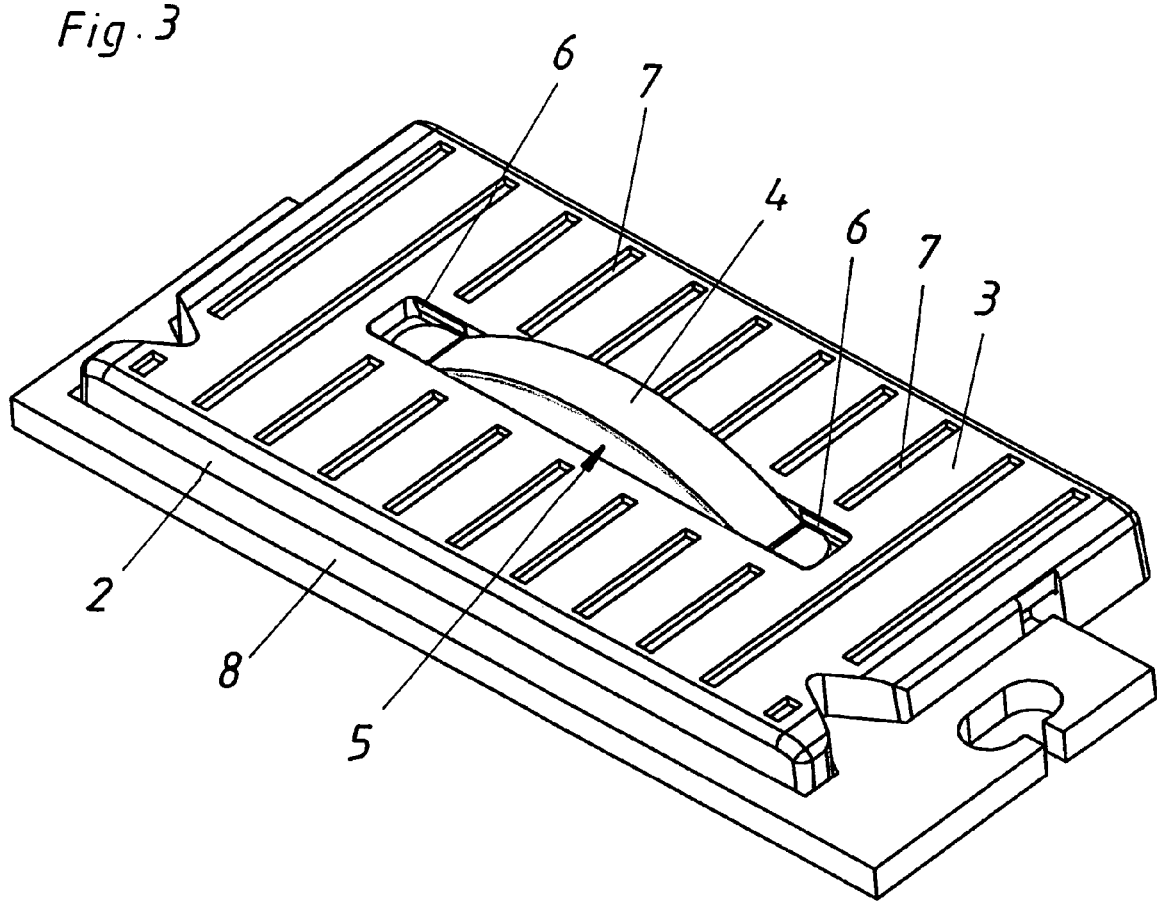

CRANE

BACKGROUND OF THE INVENTION

The present invention relates to a crane with at least one telescopic crane arm with at least two sliding arms movable against each other. At least one gliding element, which is housed loosely in a frame, is arranged between the sliding arms.

Gliding elements arranged between two sliding arms are provided to keep the friction resistance low when the sliding arms are moved against each other upon retraction and extension. It is essential that the gliding elements are housed immovable at predefined points in order to be effective in each relative position of the sliding arms. It has therefore already been proposed to glue or screw the gliding elements to one of the sliding arms. However, as the gliding elements wear over time and must be replaced, this manner of attachment is unfavorable for swift and problem-free replaceability.

As an alternative to this, it has been attempted to hold the gliding elements in a metal frame, the metal frame having to be much smaller than the thickness of the gliding elements in order not to come into contact with the opposite surface upon the relative movement of the sliding arms. As a result, in the past, worn gliding elements were sometimes pushed over the small metal frame out of the bearing.

SUMMARY OF THE INVENTION

The object of the present invention is to further develop the known gliding elements of a crane such that both a stable housing and swift replaceability are ensured.

This is achieved according to the invention in that the gliding element has a separate spring element projecting over the gliding surface of the gliding element.

Because the spring element projects over the gliding surface of the gliding element, the gliding element is always pressed onto the bearing surface with the side facing away from the gliding surface. As a result, the gliding element cannot escape even from very small holding frames.

In a particularly simple and stable version, the spring element is a leaf spring.

In order to keep the contact surface of the spring element with the opposite surface as small as possible, it is preferable for the spring element to be housed in a recess in the gliding element.

Operational reliability can be increased by securing the spring element against falling out. In particular, lateral projections from the wall of the recess can be used.

The gliding element is preferably produced from plastic. In this connection, it is possible to provide co-extruded spring elements made of plastic instead of the leaf spring.

BRIEF DESCRIPTION OF THE DRAWINGS

Further advantages and details of the present invention are illustrated by the following description of the figures, in which:

FIG. 3 is a perspective detail view of a gliding element according to the invention housed in a frame.

DETAILED DESCRIPTION OF THE INVENTION

Figure 1:
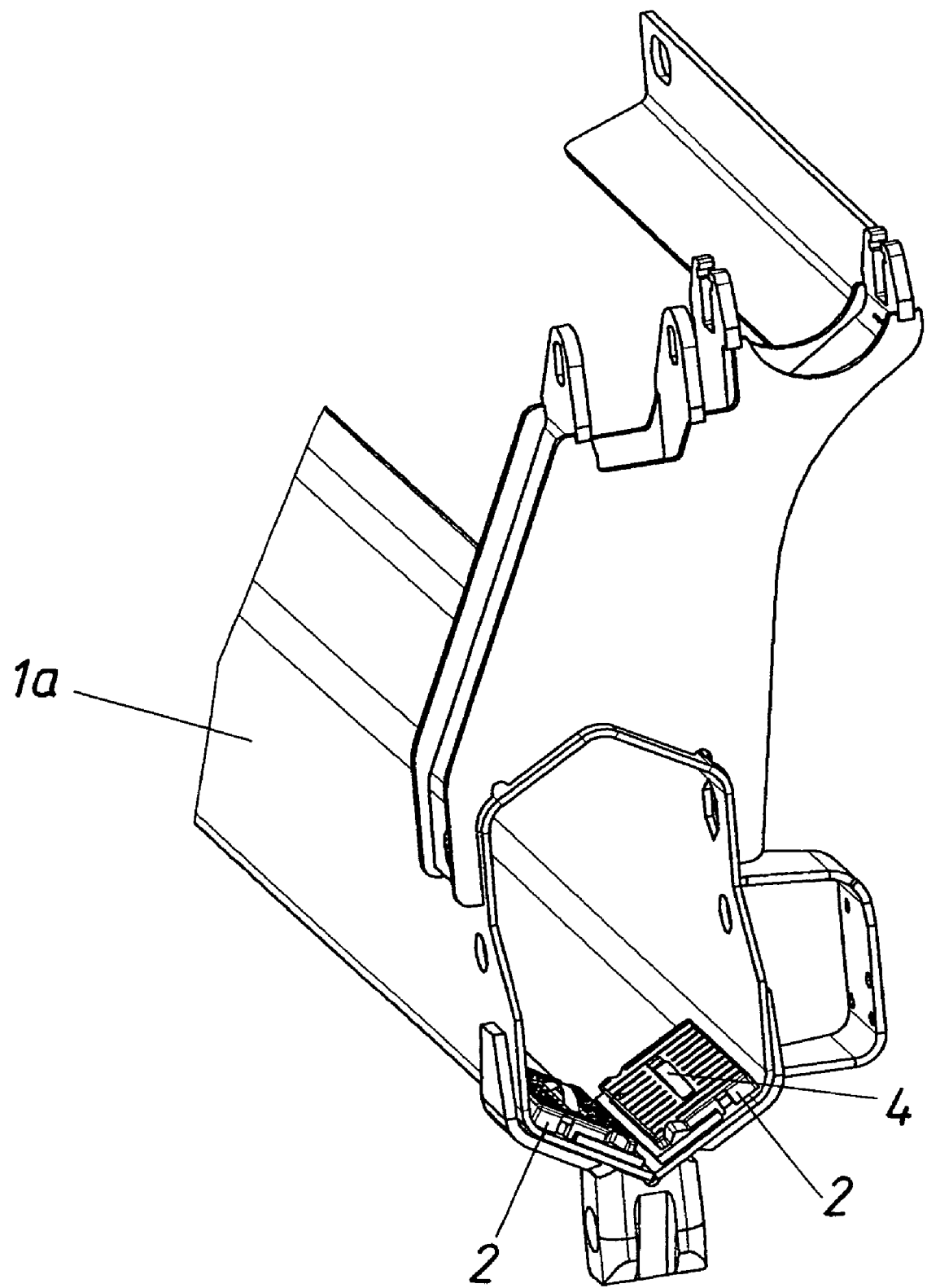
FIG. 1 is a view of a slide frame of a telescopic crane arm in which two gliding elements according to the invention are housed.
Figure 2A:
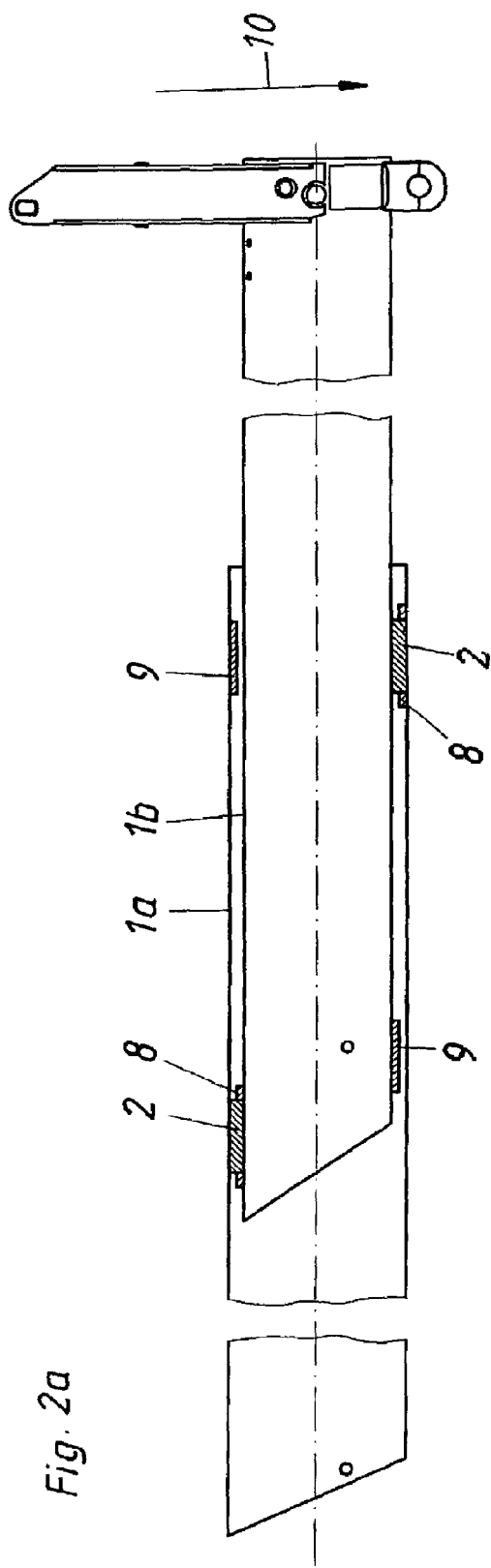
FIG. 2a is a longitudinal section view through two sliding arms having a rectangular cross-section during load "lifting"
Figure 2B:
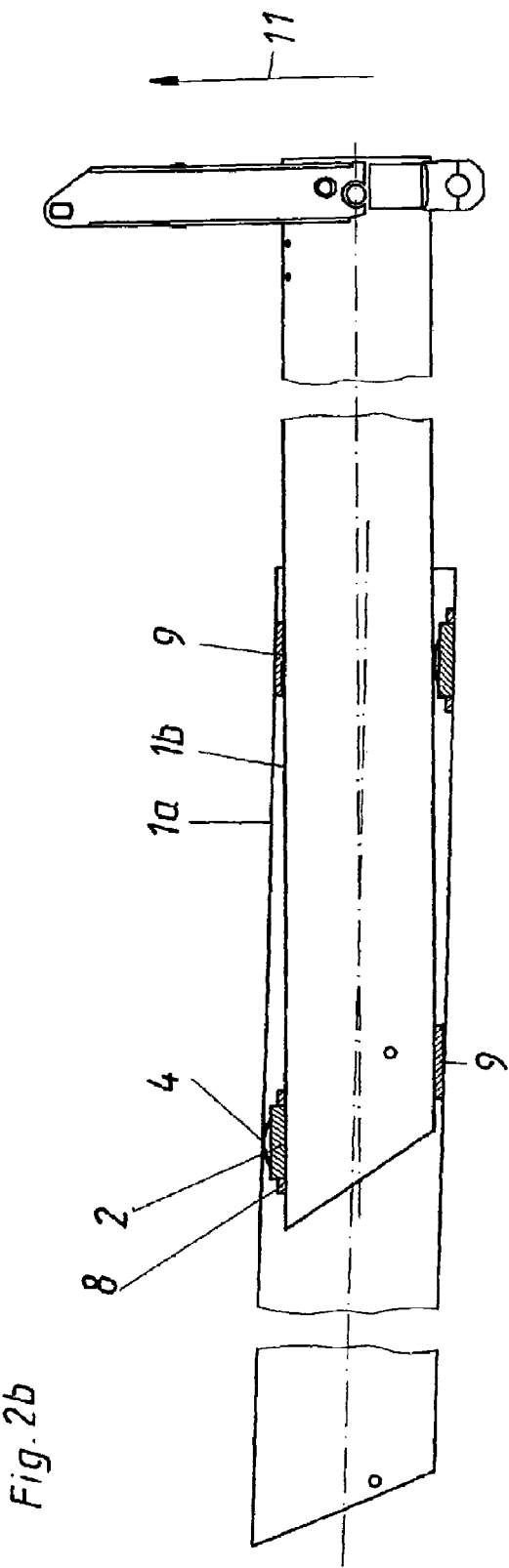
FIG. 2b is a longitudinal section view through these sliding arms during load "pressing"

In FIGS. 1, 2a and 2b, two sliding arms of a telescopic crane arm are shown in simplified form. The sliding arm 1a shown in FIG. 1 has a hexagonal cross-section with the result that each of the gliding elements 2 according to the invention are arranged in pairs in the two bottom and top surfaces. FIGS. 2a and 2b, on the other hand, illustrate a rectangular cross-section of the sliding arms 1a and 1b, with the result that each bearing is formed by a single gliding element 2.

The first and second sliding arms 1a and 1b, respectively, are movable in the longitudinal direction against each other. In the case of the load operation shown in FIG. 2a in which a load applies a force in the direction of the arrow 10, the second (inner) sliding arm 1b is pressed against the bearings at the top left and at the bottom right. In the opposite, somewhat rarer case, which is shown in FIG. 2b, the force acts in the direction of the arrow 11. In this case, the load stress is on the auxiliary gliding elements 9 which, on account of the rarity of this load operation, are normally designed much simpler than the gliding elements 2 according to the invention. The auxiliary gliding elements 9 also hardly need replacing.

As FIG. 3 shows in detail, each gliding element 2 according to the invention is composed of a flat plastic block. Cavities 7 in the shape of elongated grooves which can house lubricant are worked into the gliding surface 3. As shown in FIG. 3, the grooves 7 each extend in a direction orthogonal with respect to the longitudinal direction of the first and second sliding arms 1a, 1b. When new and after each maintenance, the cavities 7 are filled with lubricant to further reduce the coefficient of friction.

Each gliding element 2 has a body having a central recess 5 into which a spring element 4 in the shape of a pretensioned leaf spring is inserted. This spring shape has proved particularly successful. Spiral springs and any other spring systems that have a comparable effects are also conceivable. The leaf spring is secured at its ends against falling out by projections 6. In particular, the projections 6 (i.e., securing member) extend from the sides of recess 5 as shown in FIG. 3, and each end of the spring element 4 is located under corresponding projections 6 so as to prevent the spring from falling out of the recess 5. The middle section of spring 4 stands well above the gliding surface 3 of the gliding element 2. Thus, even if the opposing surface of the second (inner) sliding arm 1b is lifted from the gliding surface 3 of the gliding element 2, the spring element 4 ensures that pressure continues to be applied to the gliding element 2 so that the guiding element 2 is pressed onto the foundation (frame 8) as a result. The metal frame 8 provided around the gliding element 2 can therefore be made very low (thin) in order to ensure that it does not come into contact in any way with the opposing surface of sliding arm 16.

The leaf spring can be easily replaced if it is defective, as can the gliding element 2 which merely rests loosely (i.e., in a detached and unfastened manner) in the frame 8 but is not screwed or glued to the base.

The invention claimed is:

1. A crane comprising:
   a telescopic crane arm including a first sliding arm and a second sliding arm movable against each other; and a gliding element housed within a frame in a detached and unfastened manner so as to be located between said first sliding arm and said second sliding arm, said gliding element having:
- a gliding surface for contacting one of said first sliding arm and said second sliding arm; and
- a separate spring element projecting outward from said gliding surface.

2. The crane of claim 1, wherein said spring element is housed in a body of said gliding element.

3. The crane of claim 2, wherein said spring element is housed in a recess in said body of said gliding element.

4. The crane of claim 3, wherein said recess has a sidewall with lateral projections for securing said spring element and preventing said spring element from falling out of said recess.

5. The crane of claim 1, wherein said spring element comprises a leaf spring.

6. The crane of claim 1, further comprising a securing member for securing said spring element and preventing said spring element from falling off of said gliding member.

7. The crane of claim 1, wherein said gliding surface has cavities for accommodating lubricant therein.

8. The crane of claim 7, wherein each of said cavities comprises an elongated groove arranged orthogonally with respect to a longitudinal axis of said telescopic crane arm.

9. The crane of claim 1, wherein said gliding element is made of plastic.

10. The crane of claim 1, wherein said frame is attached to said first sliding arm, said gliding element being housed within said frame in a detached and unfastened manner.

11. The crane of claim 10, wherein said frame comprises a first frame, said gliding element comprises a first gliding element, further comprising a second frame attached to said second sliding arm and a second gliding element housed within said second frame in a detached and unfastened manner.

12. The crane of claim 1, wherein said frame is attached to one of said first sliding arm and said second sliding arm, further comprising an auxiliary gliding element attached to said one of said first sliding arm and said second sliding arm at a position opposite said frame.

* * * * *